Sept. 27, 1966 C. W. TRUE 3,275,803
PIPE HEATING APPARATUS
Filed Feb. 6, 1964
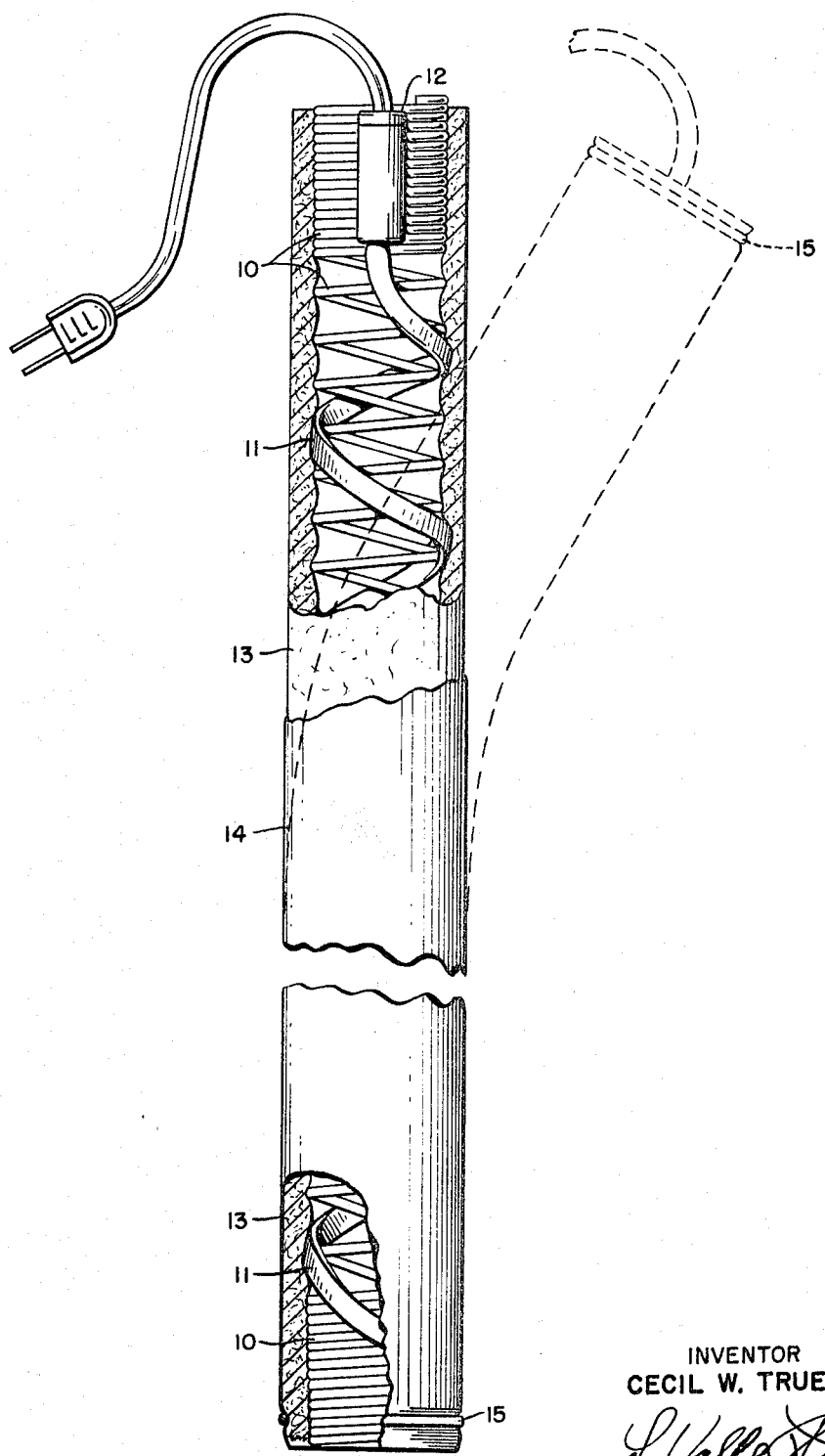
INVENTOR
CECIL W. TRUE
BY LaValle Rob
AGENT

# United States Patent Office 3,275,803
Patented Sept. 27, 1966

3,275,803
PIPE HEATING APPARATUS
Cecil W. True, 825 S. Maple, Watertown, S. Dak.
Filed Feb. 6, 1964, Ser. No. 343,008
4 Claims. (Cl. 219—535)

This invention relates to methods and apparatus for preventing water pipes from freezing or for thawing frozen pipes and, more particularly, to prefabricated apparatus for accomplishing this result.

In regions where subfreezing temperatures persist for prolonged periods of time or where extremely low subfreezing temperatures exist, considerable difficulty is encountered in preventing water pipes located in unheated buildings or in exposed areas from freezing. Copending application Serial No. 206,850, filed July 2, 1962 in the name of C. W. True, now Patent No. 3,120,600, issued on February 4, 1964, discloses apparatus for preventing riser pipes from freezing when these pipes must pass vertically through ground subjected to subfreezing temperatures. The apparatus disclosed in that application, however, generally is limited to use with riser pipes and is not particularly suitable for use with pipes located above the surface of the ground.

Furthermore, if the electrical heating unit used in the apparatus disclosed in the above-mentioned application should fail for any reason, it is desirable to replace it from the surface of the ground so that it is not necessary to dig up the entire unit, especially since the ground very likely may be frozen solid making digging difficult.

In protecting exposed water pipes, it has been the practice in the past to wind an electric heat tape over the pipe in place, then to wrap insulation over the pipe. This installation must be done by hand and is very time consuming. Because of the large amount of labor involved, such an installation is relatively expensive.

Accordingly, it is an object of this invention to construct prefabricated apparatus for preventing pipes from freezing.

It is another object of this invention to provide an insulated heating unit for pipes which may be slipped over the end of a pipe to be protected.

It is an additional object of this invention to provide a method of making prefabricated units for protecting pipes from freezing.

The aforementioned objects are accomplished in a preferred embodiment of the invention in which an inner supporting structure is made of wire wound in the form of an open helix to form a substantially hollow, flexible cylinder. An electric heat tape then is wound over the wire helix in the opposite direction, and a layer of insulation is wrapped over the heat tape. Finally, a vapor barrier layer is placed over the insulation; and the unit is clamped together at each end. The resulting structure is a flexible hollow cylinder having a thermally insulated electric heat tape contained therein.

Other advantages and features of this invention will become apparent to those skilled in the art upon consideration of the following detailed specification taken in conjunction with the drawing, the single figure of which shows a partial cut away view of a preferred embodiment of the invention.

Referring now to the drawing, there is shown a prefabricated unit having an inner supporting structure 10 consisting of steel or aluminum wire or the like wound in the form of an open helix in which the distance between adjacent turns is considerably greater than the diameter of the wire except at each end where the turns are immediately adjacent one another with no space between them. The inner diameter of the cylinder outlined by the helix is chosen to be slightly larger than the outside diameter of the pipes with which units made according to the invention are to be used.

Since the water pipes to be protected may be subjected to temperatures which may be considerably below the freezing temperature of water, an electric heat tape 11 is spirally wound or wrapped over the supporting wire 10 in a direction opposite to the direction of winding the wire 10, that is, if the wire 10 is wound in a clockwise direction, the heat tape 11 is wound in a counterclockwise direction, and vice-versa. In order to control automatically the application of electric current through the heat tape 11, a thermostat 12 is connected between the heat tape 11 and a suitable source of current (not shown). When the temperature in the region of the thermostat 12 drops below a predetermined level, which is usually at or above the freezing temperature of water, the thermostat causes current to flow through the heat tape 11; and when the temperature rises above this predetermined level, the thermostat 12 operates to interrupt current flow to the heat tape 11. It is important to locate the thermostat 12 in the region subjected to the coldest temperatures in order to ensure proper operation.

To prevent heat generated in the heat tape 11 from being conducted or radiated out into the surrounding atmosphere, a layer of suitable insulating material 13, such as Fiberglas, is wrapped around the supporting wire 10 and the heat tape 11. The insulation layer may be made of a single cylindrical piece placed around the cylinder formed by the wire 10 and the heat tape 11 or it may be made of a relatively long, narrow piece spirally wound over the heat tape 11 and wire 10. The insulation should completely cover the unit for maximum effectiveness. Of course, other types of thermal insulation besides Fiberglas may be used if so desired.

A vapor barrier wrapper 14 aids in holding the insulation layer 13 in place and protects the insulation layer 13 from moisture condensation. The wrapper 14 preferably is a polyethylene tube but other types of materials may be used when so desired. In order to hold the vapor barrier wrapper 14 and insulation layer 13 in place, a clamp 15 is placed at each end of the assembled unit where the turns of the supporting wire 10 are immediately adjacent one another. This provides the best possible utilization of the clamps 15 which preferably are made of elastic material placed under tension.

The units thus formed may be made in any desired lengths; and when it is desired to protect a water pipe from freezing, a unit of the proper length merely is slipped over the end of the pipe and connected to a suitable source of electrical current. Since the finished units are flexible due to the use of the wire helix inner support, they may be coiled for shipment and storage and, even more important, may be applied to pipes having bends or elbows therein, provided, of course, that the inner diameter of the heating unit is large enough to pass over such bends or elbows.

It should be noted that the heat tape 11 may be laid along the length of the hollow cylinder outlined by the supporting wire 10 instead of spirally wrapping it around the supporting wire 10 as shown in the drawing. Various other changes and modifications may be made by those skilled in the art without departing from the spirit and scope of the invention as set forth in the appended claims.

What is claimed is:
1. Apparatus for preventing liquid carrying pipes from freezing including
    supporting means in the form of helically wound wire for encircling a pipe,
    electric heating means directly carried by the supporting means for heating the pipe, a layer of thermal insulation covering the heating means, and flexible means for encasing the insulation layer.

2. Apparatus according to claim 1 wherein the encasing means is a vapor barrier material.

3. Apparatus for preventing liquid carrying pipes from freezing including supporting means in the form of helically wound wire for encircling a pipe, the distance between adjacent turns of the wire being substantially greater than the diameter of the wire, an electric heating wire carried solely by the supporting means for heating the pipe, the heating wire being wound over the supporting wire in a direction opposite to the direction of winding the supporting wire, a layer of thermal insulation covering the heating wire, and a vapor barrier layer encasing the insulation layer.

4. Apparatus for preventing liquid carrying pipes from freezing including, a supporting wire wound in the form of an open helix, the distance between adjacent turns of the helix being substantially greater than the diameter of the wire, an electric heat tape carried only by the supporting wire, the heat tape being wound over the supporting wire in the form of an open helix in a direction opposite to the direction of winding of the supporting wire, a substantially cylindrical layer of thermal insulation covering the heat tape and supporting wire, and a vapor barrier layer encasing the insulation layer.

References Cited by the Examiner

UNITED STATES PATENTS

| | | | |
|---|---|---|---|
| 1,399,393 | 12/1921 | Millner | 219—535 X |
| 1,480,907 | 1/1924 | Hewitt | 219—528 X |
| 2,572,695 | 10/1951 | Briscoe | 219—535 |
| 2,617,916 | 11/1952 | Neidnig | 219—549 X |
| 2,665,364 | 1/1954 | Thomas | 219—534 |
| 2,741,692 | 4/1956 | Luke | 219—528 |
| 2,824,209 | 2/1958 | Leopold | 219—528 |
| 2,865,978 | 12/1958 | Modrey | 174—47 X |
| 2,942,330 | 6/1960 | Luke | 29—155.5 |
| 2,990,607 | 7/1961 | Negromanti | 29—155.5 |
| 3,019,325 | 1/1962 | Clouse | 219—544 |
| 3,163,707 | 12/1964 | Darling | 174—47 |
| 3,211,823 | 10/1965 | Brown et al. | 174—47 |

RICHARD M. WOOD, *Primary Examiner.*

V. Y. MAYEWSKY, *Assistant Examiner.*